(12) United States Patent
Fujimori (10) Patent No.: US 9,898,996 B2
(45) Date of Patent: Feb. 20, 2018

(54) DISPLAY APPARATUS AND DISPLAY CONTROL METHOD

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 23 days.

(21) Appl. No.: 15/054,293

(22) Filed: Feb. 26, 2016

(65) Prior Publication Data
US 2016/0260410 A1   Sep. 8, 2016

(30) Foreign Application Priority Data

Mar. 3, 2015   (JP) ................. 2015-041280

(51) Int. Cl.
| | |
|---|---|
| G09G 5/00 | (2006.01) |
| G09G 5/37 | (2006.01) |
| G06F 3/041 | (2006.01) |
| G06T 11/20 | (2006.01) |
| G06F 3/0488 | (2013.01) |

(52) U.S. Cl.
CPC .......... *G09G 5/006* (2013.01); *G06F 3/0416* (2013.01); *G06F 3/0418* (2013.01); *G06F 3/0488* (2013.01); *G06T 11/203* (2013.01); *G09G 5/37* (2013.01); *G09G 2354/00* (2013.01)

(58) Field of Classification Search
CPC .... G06F 3/0416; G06F 3/0418; G06F 3/0425; G06F 3/0488; G06T 11/203; G09G 2354/00; G09G 5/006; G09G 5/37
See application file for complete search history.

(56) References Cited

U.S. PATENT DOCUMENTS

| | | | |
|---|---|---|---|
| 9,041,695 B2 | 5/2015 | Ichieda | |
| 2012/0062591 A1* | 3/2012 | Omura | G06F 3/0416 345/629 |
| 2012/0218203 A1* | 8/2012 | Kanki | G06F 3/0485 345/173 |

(Continued)

FOREIGN PATENT DOCUMENTS

| | | |
|---|---|---|
| JP | 2005-092538 A | 4/2005 |
| JP | 2008-116874 A | 5/2008 |

(Continued)

*Primary Examiner* — Hong Zhou
(74) *Attorney, Agent, or Firm* — Oliff PLC (57) ABSTRACT

A display apparatus includes a display section configured to display, on a display surface, a screen of an application program running on an information processing apparatus, a detecting section configured to detect the position of a pointer, a drawing section configured to draw, when an operation mode of the display apparatus is a first mode, a line corresponding to a track of the position, a transmitting section configured to transmit, when the operation mode is a second mode, information indicating the position to the information processing apparatus, and an erasing section configured to erase the line when a first position of the pointer when the operation mode is the first mode is within a predetermined range including a first image object for performing an input to the application program on the screen and an instruction from a user for switching the operation mode to the second mode is received.

7 Claims, 9 Drawing Sheets

(56) References Cited

U.S. PATENT DOCUMENTS

| | | |
|---|---|---|
| 2013/0162607 A1 | 6/2013 | Ichieda |
| 2013/0283198 A1* | 10/2013 | Kemmochi .......... G06F 3/0481 |
| | | 715/772 |
| 2015/0002435 A1* | 1/2015 | Shimizu ............. G06F 3/04883 |
| | | 345/173 |

FOREIGN PATENT DOCUMENTS

| | | |
|---|---|---|
| JP | 4208681 B2 | 1/2009 |
| JP | 2013-134409 A | 7/2013 |

\* cited by examiner

DISPLAY APPARATUS AND DISPLAY CONTROL METHOD

The entire disclosure of Japanese Patent Application No. 2015-041280, filed Mar. 3, 2015 is expressly incorporated by reference herein.

BACKGROUND

1. Technical Field

The present invention relates to a display apparatus that performs different kinds of processing in a first mode and a second mode according to the position of a pointer.

2. Related Art

There is known a display apparatus that displays an image corresponding to a position pointed by a pointer on a display surface. For example, JP-A-2013-134409 (Patent Literature 1) describes a projector that projects an image corresponding to a position pointed by a pointer to be superimposed on an image supplied from a video supply apparatus (a PC). Operation modes of the projector include an operation mode in which the projector draws an image according to a coordinate of the pointer and an operation mode in which the PC draws an image using the coordinate of the pointer as a coordinate of a pointing device. In Patent Literature 1, the two operation modes are switched according to operation on a displayed menu bar. JP-A-2005-92538 (Patent Literature 2) mentions that, in a display apparatus including a touch panel, an operation mode is switched according to a drag length (length of movement from a touch point on a screen to a detach point from the screen).

In the technique described in Patent Literature 1, a user needs to perform operation for causing the projector to display a menu and selecting an item equivalent to the switching of the operation modes out of the menu. Whether the user intends to perform the switching of the operation modes sometimes depends on an image object displayed by the video supply apparatus in the position pointed by the pointer. However, this point is not taken into account in the technique described in Patent Literature 2. In Patent Literatures 1 and 2, when the switching of the operation modes is not performed as intended by the user and a line against the intention of the user is drawn, the user needs to perform operation for erasing the line.

SUMMARY

An advantage of some aspects of the invention is to provide a technique for automatically erasing a line drawn against the intention of a user when operation modes are switched.

An aspect of the invention provides a display apparatus including: a display section configured to display, on a display surface, a screen of an application program running on an information processing apparatus; a detecting section configured to detect the position of a pointer on the display surface; a drawing section configured to draw, on the display surface, a line corresponding to a track of the position detected by the detecting section when an operation mode of the display apparatus is a first mode, a transmitting section configured to transmit information indicating the position detected by the detecting section to the information processing apparatus when the operation mode is a second mode, and an erasing section configured to erase the line when a first position of the pointer detected by the detecting section, when the operation mode is the first mode is within a predetermined range including a first image object for performing an input to the application program on the screen and when an instruction from a user for switching the operation mode to the second mode is received.

According to the display apparatus, it is possible to automatically erase a line drawn against the intention of the user when the operation modes are switched.

In the display apparatus according to the aspect, when the first position is within the predetermined range including the first image object and the instruction from the user for switching the operation mode to the second mode is received, the erasing section may erase the line when a position of the pointer detected by the detecting section after the operation mode is switched to the second mode is within a predetermined range including the first position.

According to the display apparatus with this configuration, it is possible to more accurately specify the line drawn against the intention of the user.

In the display apparatus according to the aspect, when the operation mode is a third mode, the display section may display, on the display surface, a second image object for inputting an instruction for switching the operation mode to the second mode.

According to the display apparatus with this configuration, it is possible to reduce a burden on the user for switching the operation mode to the second mode.

In the display apparatus according to the aspect, the erasing section may erase the line when the first position is within the predetermined range including the first image object and the instruction from the user for switching the operation mode to the second mode is received via the second image object.

According to the display apparatus with this configuration, it is possible to more accurately specify the line drawn against the intention of the user.

In the display apparatus according to the aspect, the display section may display the second image object within the predetermined range including the first position.

According to the display apparatus with this configuration, it is possible to reduce a burden on the user for switching the operation mode to the second mode.

Another aspect of the invention provides a display control method including: allowing a display apparatus to display, on a display surface, a screen of an application program running on an information processing apparatus; detecting the position of a pointer on the display surface; drawing, on the display surface, a line corresponding to a track of the detected position when an operation mode of the display apparatus is a first mode; transmitting information indicating the detected position from the display apparatus to the information processing apparatus when the operation mode is a second mode; and erasing the line when a first position of the pointer detected, when the operation mode is the first mode is within a predetermined range including a first image object for performing an input to the application program on the screen and when an instruction from a user for switching the operation mode to the second mode is received.

According to the display control method, it is possible to automatically erase a line drawn against the intention of the user when the operation modes are switched.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Configuration

Figure 1:
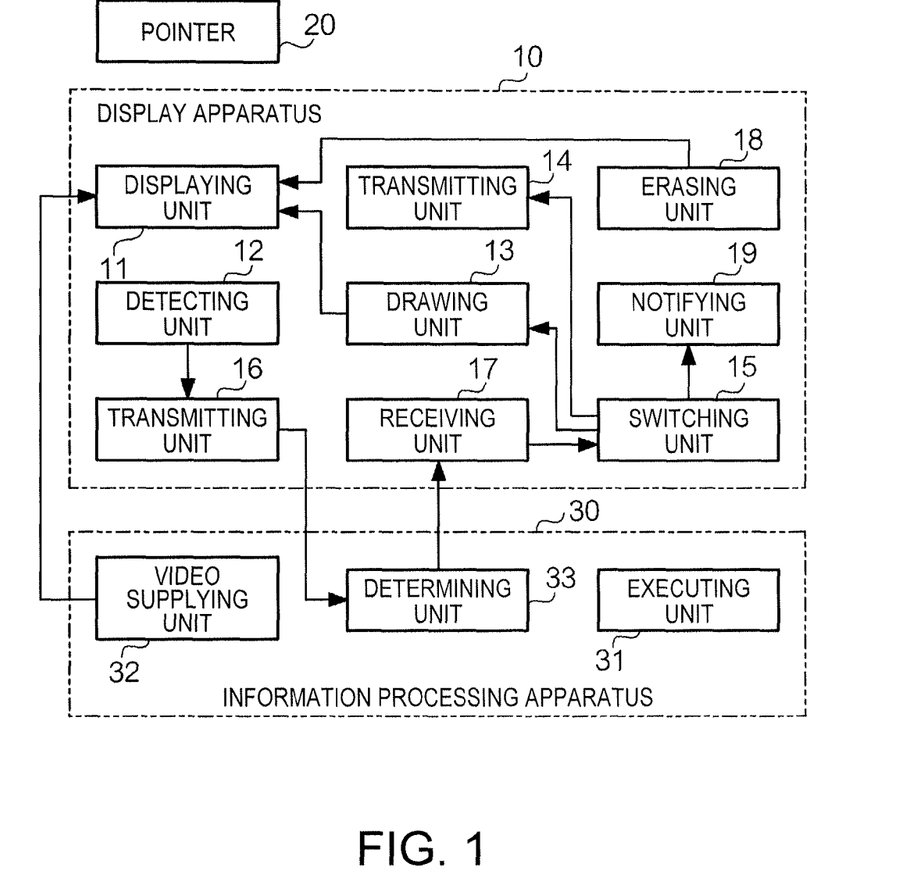
FIG. 1 is a diagram showing the functional configuration of a display system according to an embodiment.

FIG. 1 is a diagram showing the functional configuration of a display system 1 according to an embodiment. The display system 1 includes a display apparatus 10, a pointer 20, and an information processing apparatus 30. The display apparatus 10 is an apparatus that displays a video supplied from the information processing apparatus 30 on a display surface. The information processing apparatus 30 is an example of a video supply apparatus that supplies a video to the display apparatus 10. In this example, the information processing apparatus 30 is a general-purpose personal computer. The information processing apparatus 30 has a function of causing an application program to run.

The pointer 20 is a device that points a position on the display surface. The display apparatus 10 performs processing corresponding to the position pointed by the pointer 20. In this example, the processing corresponding to the pointed position is different depending on an operation mode of the display apparatus 10. The display system 1 has a function of automatically switching the operation mode.

The display apparatus 10 includes a displaying unit 11, a detecting unit 12, a drawing unit 13, a transmitting unit 14, a switching unit 15, a transmitting unit 16, a receiving unit 17, an erasing unit 18, and a notifying unit 19.

The displaying unit 11 displays, on the display surface, a screen of the application program running on the information processing apparatus 30. The screen of the application program means a screen generated in the information processing apparatus 30 according to execution of the application program. For example, in the case of a GUI (Graphical User Interface) of a multi-window, the screen of the application program means an entire desktop screen including a window of an active application program. The display surface is a surface on which an image is displayed. For example, when the display apparatus 10 is a projector, the display surface is a projection screen or a wall surface. When the display apparatus 10 is a liquid crystal display, the display surface is a liquid crystal panel.

The detecting unit 12 detects the position of the pointer 20 on the display surface (hereinafter simply referred to as "position of the pointer 20"). In this example, the detecting unit 12 detects an event including the position of the pointer 20. The pointer 20 is used by a user to designate a position on the display surface 11. The pointer 20 is, for example, an electronic pen or a finger of the user. The detecting unit 12 includes, for example, a camera that picks up an image of the display surface. The detecting unit 12 detects the position of the pointer 20 according to a shape or a color of the pointer 20 or light emission of a light emitting body (e.g., an infrared light emitting diode) provided in the pointer 20. The detecting unit 12 may detect the position of the pointer 20 with a pressure sensor or an electrostatic sensor provided on the display surface. The detecting unit 12 recognizes a type of an event, for example, according to light emission pattern of the light emitting body.

Events related to the pointer 20 include, for example, a pen-down event and a pen-up event. The pen-down event is an event indicating that the pointer 20 is in contact with the display surface. The pen-down event includes information (e.g., a coordinate) indicating a position where the pointer 20 is in contact with the display surface. The pen-up event is an event indicating that the pointer 20 in contact with the display surface is separated from the display surface. The pen-up event includes information indicating a position where contact is detected last before the pointer 20 in contact with the display surface is separated from the display surface.

The drawing unit 13 is a function enabled when the operation mode of the display apparatus 10 is a first mode. The drawing unit 13 draws, on the display surface, a line (i.e., a handwritten image) corresponding to a track of the position of the pointer 20. In this example, the drawing unit 13 draws a line according to a track of the position of the pointer 20 during continuous detection of the pen-down event. More specifically, the drawing unit 13 draws a line according to a position where the pen-down event is detected for the first time in a state in which the pen-down event is not detected to a position where the pen-up event is detected later.

The transmitting unit 14 is a function enabled when the operation mode of the display apparatus 10 is a second mode. The transmitting unit 14 transmits information indicating the position of the pointer 20 to the information processing apparatus 30. That is, the second mode is an operation mode for using the pointer 20 as a pointing device of the information processing apparatus 30.

The switching unit 15 switches the operation mode of the display apparatus 10. For example, the switching unit 15 switches the operation mode according to an instruction input from the user.

The transmitting unit 16 transmits an inquiry to the information processing apparatus 30. The inquiry is an inquiry concerning whether the position of the pointer 20 detected by the detecting unit 12 is a position equivalent to a UI (User Interface) object. The UI object means an image object for, on a screen of an application program running on the information processing apparatus 30, performing an input to the application program. The UI object is, for example, an icon, a button, and a menu item. The position equivalent to the UI object means a predetermined range including the UI object (e.g., a range obtained by adding a predetermined margin to the external shape of the UI object). Note that the inquiry includes the information indicating the position of the pointer 20.

The receiving unit 17 receives a reply to the inquiry. The replay includes a determination result concerning whether the position of the pointer 20 is the position equivalent to the UI object.

The erasing unit 18 erases, when a specific condition is satisfied, a line drawn by the drawing unit 13 immediately before the specific condition is satisfied. The specific condition is, for example, a condition that a first position of the pointer 20 detected by the detecting unit 12 when the operation mode is the first mode is within a predetermined range including a first image object for performing an input to the application program on the screen displayed on the display surface and an instruction from the user for switching the operation mode to the second mode is received.

The notifying unit 19 notifies the user that the operation mode is switched. The notification to the user is performed via, for example, an image, sound, or vibration.

The information processing apparatus 30 includes an executing unit 31, a video supplying unit 32, and a determining unit 33. The executing unit 31 executes a computer program. The video supplying unit 32 supplies a video to the display apparatus 10. In this example, the video supplying unit 32 supplies a screen of the computer program executed by the executing unit 31. The determining unit 33 determines, in response to an inquiry from the display apparatus 10, whether a position related to the inquiry is a position equivalent to a UI object of the computer program executed by the executing unit 31. Further, the determining unit 33 transmits a determination result to the display apparatus 10.

Figure 2:
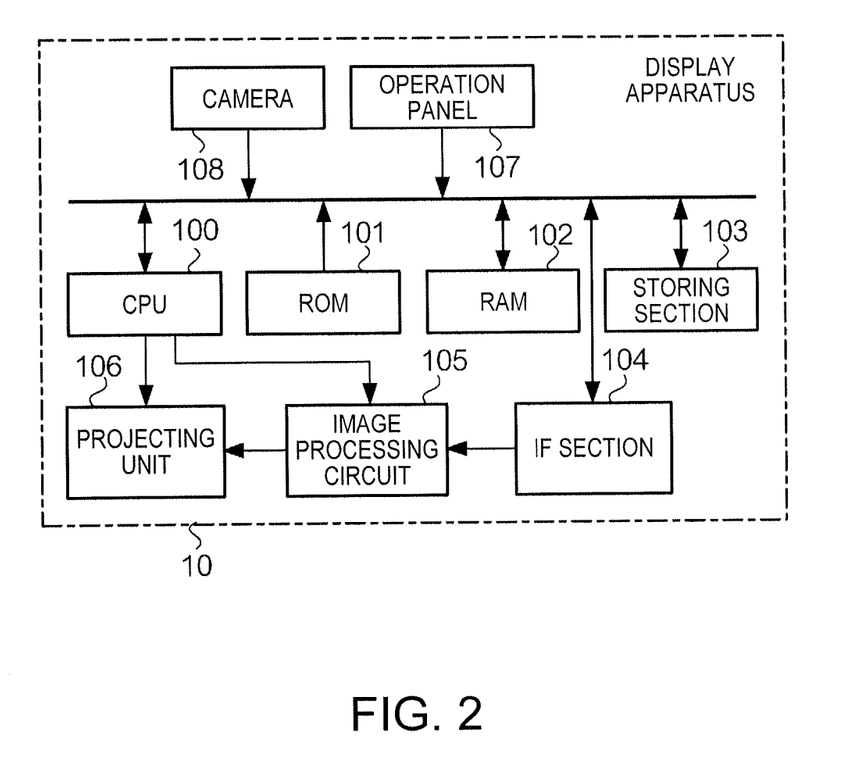
FIG. 2 is a diagram illustrating the hardware configuration of a display apparatus.

FIG. 2 is a diagram illustrating the hardware configuration of the display apparatus 10. The display apparatus 10 includes a CPU (Central Processing Unit) 100, a ROM (Read Only Memory) 101, a RAM (Random Access Memory) 102, a storing section 103, an IF section 104, an image processing circuit 105, a projecting unit 106, an operation panel 107, and a camera 108.

The CPU 100 is a control device that controls the sections of the display apparatus 10. The ROM 101 is a nonvolatile storage device having stored therein various computer programs and data. The RAM 102 is a volatile storage device that stores data. The RAM 102 functions as a work area used by the CPU 100 in executing processing. The storing section 103 is a nonvolatile storage device that stores data, computer programs, and the like. The storing section 103 includes, for example, a flash ROM, an SSD (Solid State Drive), or an HDD (Hard Disk Drive). Note that the storing section 103 may be included in the ROM 101. Alternatively, the storing section 103 may be a storage device on a network.

The IF section 104 is an interface that mediates exchange of signals or data with an external apparatus (e.g., the information processing apparatus 30). The IF section 104 includes terminals (e.g., a VGA terminal, a USB terminal, a wired LAN interface, an S terminal, an RCA terminal, an HDMI (High-Definition Multimedia Interface: registered trademark) terminal, and a microphone terminal) and a wireless LAN interface for exchanging signals or data with the external apparatus. The terminals may include a video output terminal in addition to a video input terminal.

The image processing circuit 105 applies predetermined image processing (e.g., a size change and keystone correction) to a video signal input thereto (hereinafter referred to as "input video signal").

The projecting unit 106 projects an image on a projection surface such as a projection screen or a wall surface according to the video signal applied with the image processing. The projecting unit 106 includes a light source, a light modulator, and an optical system (all of which are not shown in the figure). The light source includes a lamp such as a high-pressure mercury lamp, a halogen lamp, or a metal halide lamp or a solid-state light source such as an LED (Light Emitting Diode) or a laser diode and a driving circuit for the lamp or the solid-state light source. The light modulator is a device that modulates, according to the video signal, light radiated from the light source. The light modulator includes, for example, a liquid crystal panel or a DMD (Digital Mirror Device) and a driving circuit for the liquid crystal panel or the DMD. Note that the liquid crystal panel may be either a transmission type or a reflection type. The optical system is configured by, for example, an element that projects the light modulated by the light modulator on the projection screen. The optical system includes, for example, a mirror, a lens, and a prism. The light source and the light modulator may be provided for each color component.

The operation panel 107 is an input device with which the user inputs an instruction to the display apparatus 10. The operation panel 107 includes, for example, a keypad, buttons, or a touch panel.

The camera 108 is a camera for specifying the position of the pointer 20. In this example, the pointer 20 includes a light emitting body (e.g., an infrared light emitting diode), a pressure sensor, and a control circuit (all of which are not shown in the figure) at a pen nib. When the pressure sensor detects contact of the pen nib with an object (the projection surface, etc.), the control circuit causes the light emitting body to emit light in a predetermined light emission pattern. The camera 108 is an infrared camera. The camera 108 photographs an image of the projection surface. The CPU 100 specifies the position of the pointer 20 and an event corresponding to the pointer 20 from the image photographed by the camera 108.

In this example, the projecting unit 106 is an example of the displaying unit 11. The projection surface is the display surface. The camera 108 and the CPU 100 are examples of the detecting unit 12. The IF section 104 is an example of the transmitting unit 14, the transmitting unit 16, and the receiving unit 17. The CPU 100 is an example of the drawing unit 13, the switching unit 15, the erasing unit 18, and the notifying unit 19.

The information processing apparatus 30 is, for example, a general-purpose personal computer. The information processing apparatus 30 includes hardware elements (all of which are not shown in the figure) such as a CPU, a ROM, a RAM, a storing section, and an IF section. The storing section includes, in addition to an operating system (OS) and an application program (e.g., a computer program for sequentially displaying slides of presentation), a computer program for replaying an inquiry from the display apparatus 10 (hereinafter referred to as "position determining program"). The position determining program runs on the background of the application program. In the information processing apparatus 30, the CPU is an example of the executing unit 31 and the determining unit 33. The IF section is an example of the video supplying unit 32.

2. Overview of the Operation Modes

The operation modes of the display apparatus 10 is explained. In this example, the operation modes of the display apparatus 10 include an interactive mode (an example of the first mode) and a PC mode (an example of the second mode).

Figure 3:
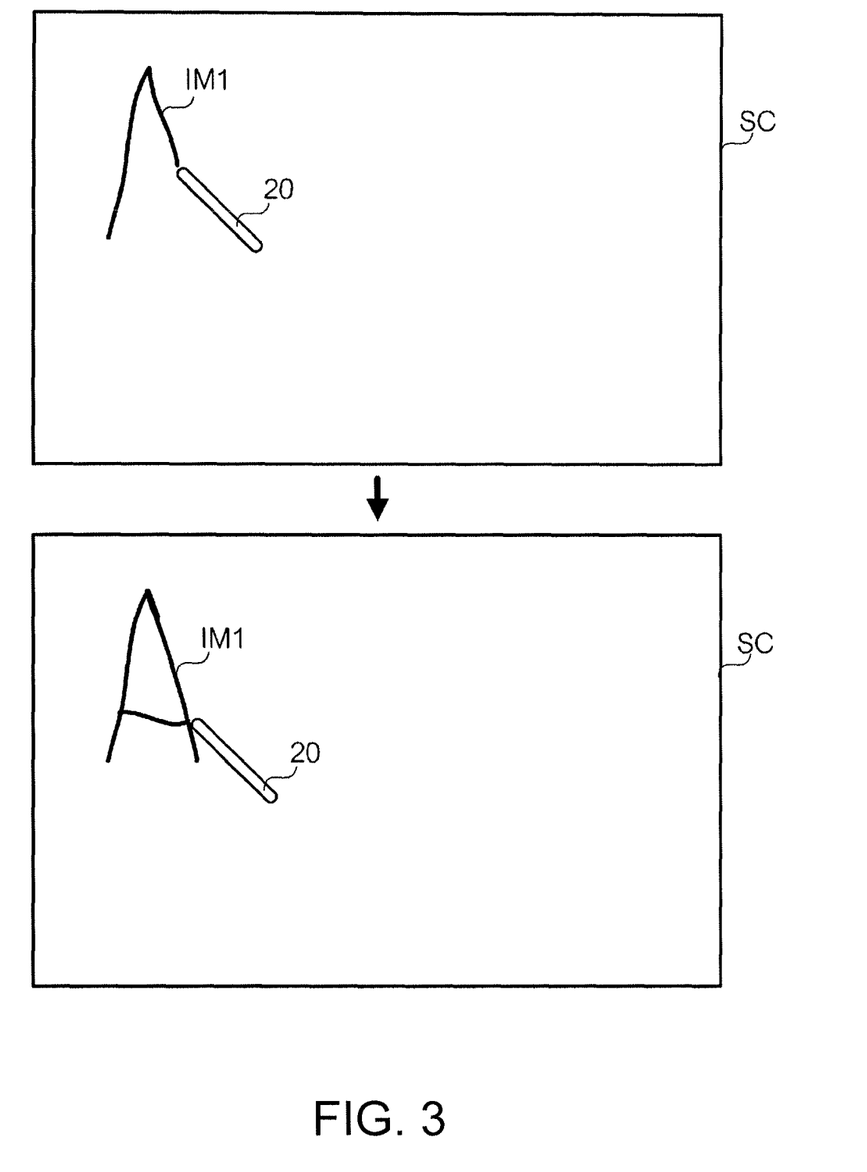
FIG. 3 is a diagram showing an overview of an interactive mode.

FIG. 3 is a diagram showing an overview of the interactive mode. The interactive mode is an operation mode in which the display apparatus 10 draws a line (hereinafter referred to as "handwritten image") corresponding to a track of the pointer 20. In the interactive mode, the display apparatus 10 can be used like a whiteboard or an electronic blackboard. Further, the display apparatus 10 can display an image obtained by superimposing the handwritten image on a video supplied from the video supply apparatus and combining the video and the handwritten image. For example, the display apparatus 10 can superimpose and display the handwritten image (in this case, an annotation or a memorandum) on a screen of an application program executed by the information processing apparatus 30. In an example shown in FIG. 3, a handwritten image IM1 is displayed on a screen SC according to a track of movement of the pointer 20 moved by the user while being kept in contact with the projection surface.

Figure 4:
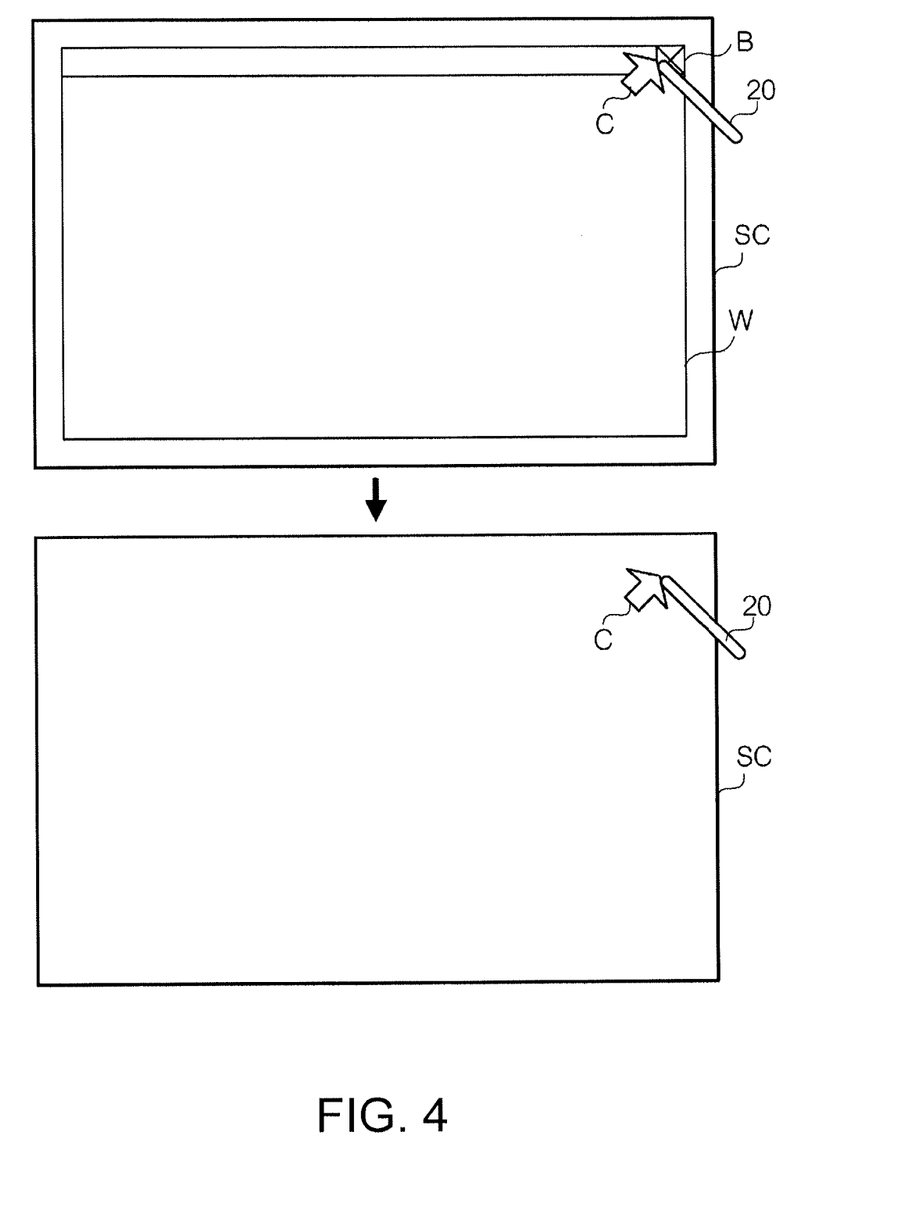
FIG. 4 is a diagram showing an overview of a PC mode.

FIG. 4 is a diagram showing an overview of the PC mode. The PC mode is an operation mode in which the pointer 20 is used as a pointing device of the information processing apparatus 30. The display apparatus 10 transmits information indicating an event including a position (a coordinate) of the pointer 20 on the projection surface to the information processing apparatus 30. A device driver of the information processing apparatus 30 converts the information transmitted from the display apparatus 10 into information concerning mouse operation and passes the information to the OS.

The display apparatus 10 displays the screen of the application program executed by the information processing apparatus 30. In this example, the screen includes a mouse cursor C and a window W of the application program. The window W includes a button B. The button B is an example of a UI object for performing an input to the application program and is a button for closing the window W. When the user touches the projection surface with the pointer 20, the mouse cursor C moves to a touched position. When the position touched by the user is the button B, it is interpreted that the button B is clicked. The window W closes.

When the user is drawing the handwritten image in the interactive mode in a state in which the screen of the application program (e.g., the slides of the presentation) is displayed on the background, if the user attempts to perform an input to the UI object of the application program, the user needs to touch the vicinity of the UI object with the pointer 20 after switching the operation mode to the PC mode. However, for example, when the switching of the operation modes is performed according to an instruction of the user, if the user forgets to perform operation of operation mode switching and touches the vicinity of the UI object with the pointer 20 while keeping the interactive mode, a line (or a dot) against the intention of the user is drawn in the vicinity of the UI object.

If the user touches the vicinity of the UI object by mistake in the interactive mode, it is assumed that the user performs, for example, operation described below.

(1) A line (or a dot) is drawn in the vicinity of the UI object according to the wrong touch.

(2) The user selects an "erase" function from a control menu.

(3) The user touches the vicinity of the line drawn by mistake in (1) and erases the line.

(4) The user selects a "mode switching" function from a control menu.

(5) The user touches the vicinity of the UI object and performs operation on the UI object.

In this way, if the wrong operation is performed, the user has to perform a lot of operation in order to recover from the wrong operation. Therefore, a burden on the user is large. In this embodiment, the burden on the user during the wrong operation is reduced.

3. Operation

Several operation examples of the display system 1 are explained below. The operation examples explained below may be independently used or two or more operation examples may be used in combination.

3-1. Operation Example 1

Figure 5:
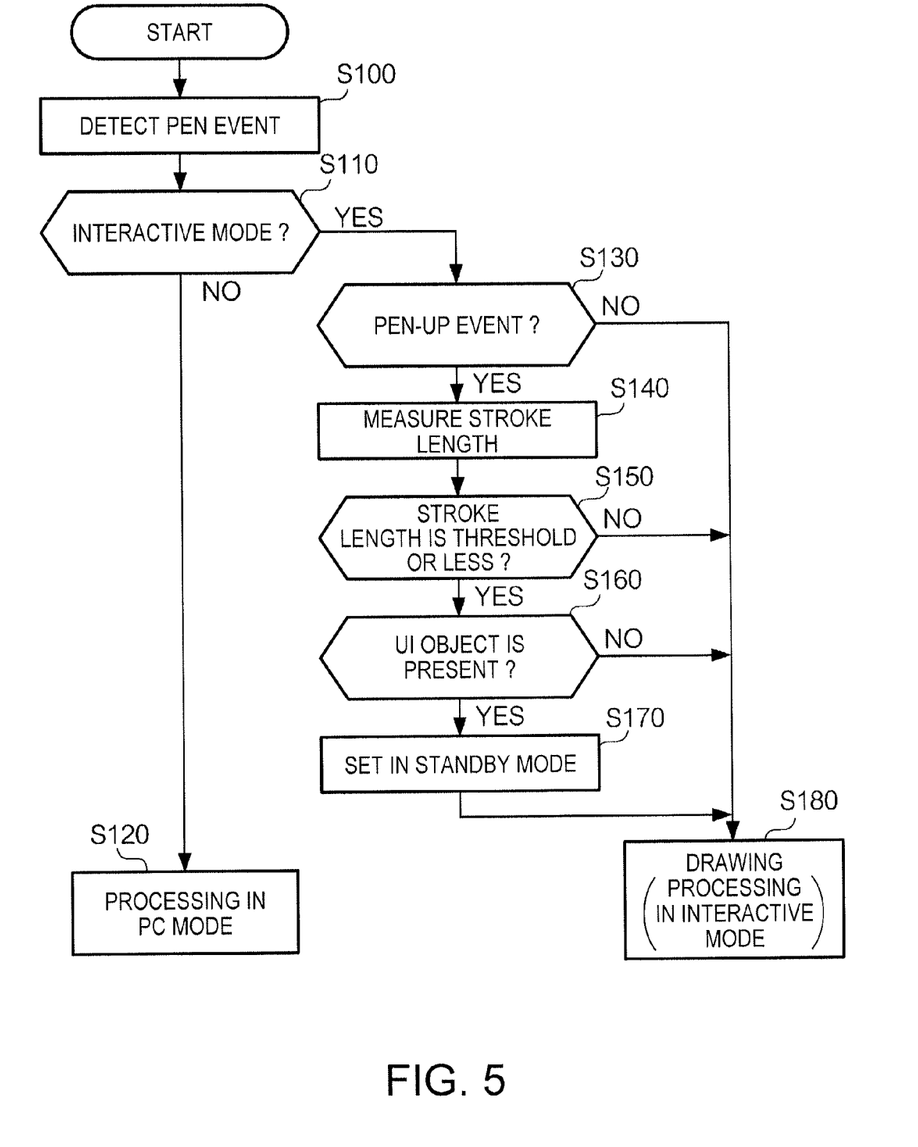
FIG. 5 is a flowchart for explaining the operation of the display system according to the embodiment.

FIG. 5 is a flowchart for explaining the operation of the display system 1 according to the embodiment. A flow shown in FIG. 5 is started, for example, when a power supply of the display apparatus 10 is turned on. Note that, in the following explanation, software is sometimes described as an entity of processing. This means that a hardware resource (a CPU, etc.) executing the software performs processing in cooperation with the other hardware resources (a memory, a communication interface, etc.).

Note that, in this example, switching from the interactive mode to the PC mode is performed, for example, according to an instruction of the user via the control menu displayed on the screen by the function of the display apparatus 10.

In step S100, the CPU 100 of the display apparatus 10 detects a pen event. Details are as explained below. The CPU 100 periodically acquires an image photographed by the camera 108. The CPU 100 specifies, from the position of a light emitting point and a change in light emission intensity included in the image, a pen event and a position where the pen event has occurred. The position is converted into a coordinate on a coordinate system based on the projection screen. The CPU 100 stores the detected pen event (including the coordinate) in the RAM 102.

In step S110, the CPU 100 determines whether the present operation mode is the interactive mode. If determining that the operation mode is the PC mode (NO in S110), the CPU 100 shifts the processing to step S120. If determining that the operation mode is the interactive mode (YES in S110), the CPU 100 shifts the processing to step S130.

In step S120, the CPU 100 executes processing in the PC mode, that is, transmits the detected pen event (including the coordinate) to the information processing apparatus 30. When ending the processing in step S120, the CPU 100 shifts the processing to step S100 again.

In step S130, the CPU 100 determines whether the detected event is the pen-up event. If the detected pen event is the pen-up event (YES in S130), the CPU 100 shifts the processing to step S140. If the detected event is not the pen-up event (NO in S130), the CPU 100 shifts the processing to step S180.

In step S140, the CPU 100 measures a stroke length concerning a most recent pen event. The stroke length means the length of a line corresponding to a track of the position of the pointer 20. The line corresponding to the track of the position of the pointer 20 means a line drawn using coordinates included in continuously detected pen-down events, that is, a track of movement of the pointer 20 moved while being kept in contact with the projection surface. The CPU 100 measures the stroke length concerning a line just finished to be drawn (a line on which the pen-up event is just detected).

In step S150, the CPU 100 determines whether the measured stroke length is a threshold or less. The threshold is a threshold serving as a determination reference for the switching of the operation modes. In other words, the threshold is a threshold serving as a determination reference for determining whether operation of the pointer 20 by the user is operation on the UI object (the icon, the button, etc.) on the screen or operation for drawing a line. When the stroke length is smaller than the size (the height or the width) of the UI Object, the operation of the pointer 20 is likely to be an instruction input (click, etc.) to the UI object. Therefore, the threshold is set to a size as large as the size of the UI object.

If determining that the stroke length is the threshold or less (YES in S150), the CPU 100 shifts the processing to step S160. If determining that the stroke length exceeds the threshold (NO in S150), the CPU 100 shifts the processing to step S180.

Step S160, the CPU 100 determines whether the UI object displayed by the information processing apparatus 30 is present in the coordinate where the pen-up event is detected. In this example, the display apparatus 10 alone cannot determine whether the UI object is present in the coordinate. Therefore, the display apparatus 10 inquires the information processing apparatus 30, which is the video supply apparatus, whether the UI object is present in the coordinate. Details are as explained below.

The CPU 100 transmits an inquiry to the information processing apparatus 30. The inquiry may be transmitted through a route same as a route of a video signal or may be transmitted through a route different from the route of the video signal. The inquiry includes information indicating the coordinate where the pen-up event is detected.

When receiving the inquiry from the display apparatus 10, the position determining program of the information processing apparatus 30 converts the coordinate included in the inquiry into a coordinate on a desktop (the screen) of the information processing apparatus 30. The position determining program determines whether the UI object is present in the coordinate. The position determining program performs the determination by, for example, inquiring the OS whether an object responding with a click is present in the coordinate. The OS has a function of determining, when a coordinate is designated, whether an object that can be clicked is present in the coordinate. The position determining program generates, using a result of the determination, a replay to the inquiry from the display apparatus 10. The reply includes a determination result concerning whether the UI object is present in the coordinate. The position determining program transmits the generated replay to the display apparatus 10.

When receiving the replay from the information processing apparatus 30, the CPU 100 of the display apparatus 10 determines, according to the replay, whether the UI object is present in the coordinate. If determining that the UI object is present (YES in S160), the CPU 100 shifts the processing to step S170. If determining that the UI object is absent (NO in S160), the CPU 100 shifts the processing to step S180.

In step S170, the CPU 100 enables a standby mode (an example of a third mode). The standby mode means a state in which erasing of a line drawn most recently (a line on which the pen-up event is just detected) is waited. In the following explanation, the line is referred to as "candidate line" in the sense that the line is a candidate to be erased. The CPU 100 stores a coordinate of a representative point of the candidate line in the RAM 102. The representative point is, for example, an end point, a start point, a middle point, or the center of gravity of the line. Details of an operation in the standby mode are explained below.

Note that the standby mode can be set simultaneously with the other operation modes (the interactive mode and the PC mode). Therefore, when the standby mode is enabled, this means that the standby mode is "ON". When the standby mode is disabled (released), this means that the standby mode is "OFF". When the standby mode is ON, processing corresponding to the other enabled operation modes is concurrently performed. For example, when the standby mode is ON when the operation mode is the interactive mode, a line corresponding to a track of the pointer 20 is drawn. Alternatively, when the standby mode is ON when the operation mode is the PC mode, a coordinate of a pen event is transmitted to the information processing apparatus 30.

In step S180, the CPU 100 executes the processing in the interactive mode, that is, draws a line concerning a most recent pen-up event. The line concerning the most recent pen-up event means the line on which the stroke length is measured in step S130. Even when the standby mode is ON, a line corresponding to a track of the pointer 20 is drawn. When the processing in step S170 ends, the CPU 100 shifts the processing to step S100.

Figure 6:
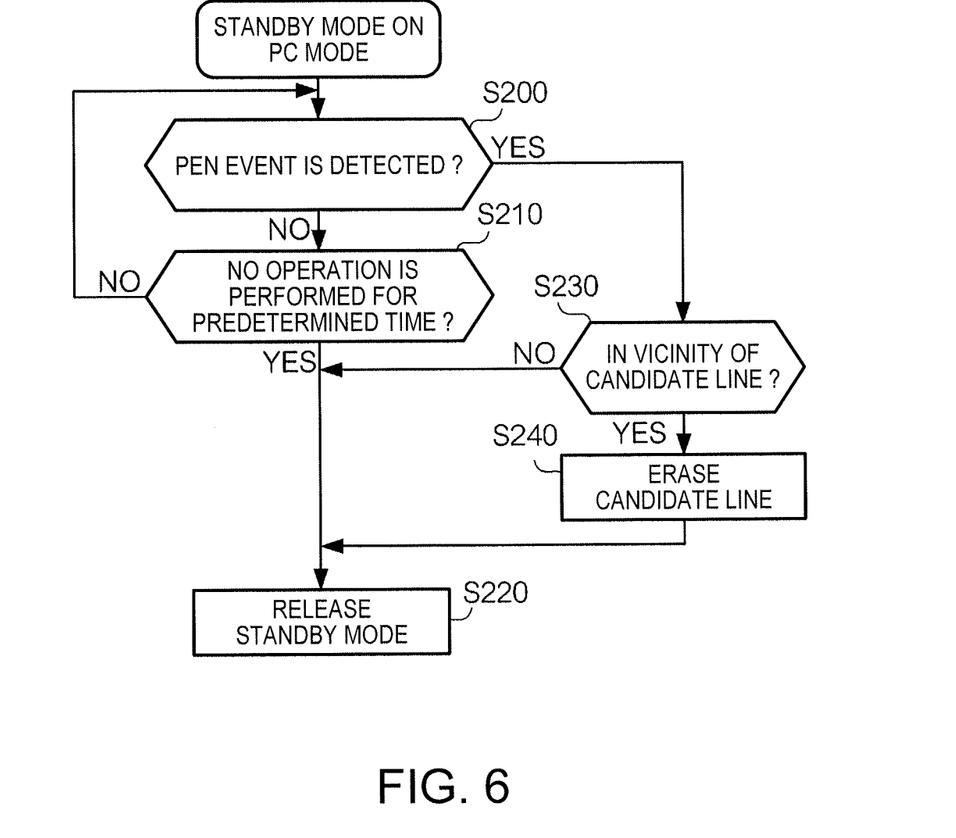
FIG. 6 is a flowchart for explaining an operation in a standby mode.

FIG. 6 is a flowchart for explaining an operation in the standby mode. Note that the flow indicates an example in which the standby mode is ON and the operation mode is the PC mode. That is, after the standby mode is turned on, the operation mode is switched to the PC mode according to an instruction of the user. Note that processing related to switching of the operation mode between the interactive mode and the PC mode is not shown in the flow of FIG. 5.

In step S200, the CPU 100 detects a pen event. The CPU 100 stores the detected pen event (including a coordinate) in the RAM 102. When some pen event is detected (YES in S200), the CPU 100 shifts the processing to step S230. If a pen event is not detected (NO in S200), the CPU 100 shifts the processing to step S210.

In step S210, the CPU 100 determines whether a state in which a pen event is not detected continues for a threshold time, that is, whether pen operation is not performed for the threshold time (a predetermined time). If the state in which a pen event is not detected continues for the threshold time (YES in S210), the CPU 100 shifts the processing to step S220. If the state in which a pen event is not detected does not continue for the threshold time (NO in S210), the CPU 100 shifts the processing to step S200.

In step S220, the CPU 100 releases the standby mode (switches the standby mode to the OFF state). Then the standby mode is switched to the OFF state, the processing leaves the flow of FIG. 6.

In step S230, the CPU 100 determines whether a coordinate where the pen event is detected is near the candidate line. The determination is performed by, for example, (1) comparing the coordinate where the pen event is detected and the coordinate of the representative point of the candidate line or (2) comparing the coordinate where the pen event is detected and the position of the UI object. When the method of (1) is used, the CPU 100 compares the coordinate of the representative point stored in the RAM 102 and the coordinate where the pen event is detected. When the distance between the coordinates is a threshold or less, the CPU 100 determines that the coordinate where the pen event is detected is near the candidate line. When the method of (2) is used, the CPU 100 inquires the information processing apparatus 30 whether the coordinate where the pen event is detected is in the vicinity of the UI object.

If determining that the coordinate where the pen event is detected is near the candidate line (YES in S230), the CPU 100 shifts the processing to step S240. If determining that the coordinate where the pen event is detected is not near the candidate line (NO in S230), the CPU 100 shifts the processing to step S220.

In step S240, the CPU 100 erases the candidate line from the screen. Note that, as lines drawn in the interactive mode, handwritten images are grouped and stored according to a rule that, for example, lines on which a time interval between the pen-up event and the following pen-down event is a threshold time or less are treated as a group of handwritten images. Therefore, the CPU 100 can change an attribute of an image for each of the groups. Note that the candidate line only has to be erased from the screen. Data of the candidate line may be left in the RAM 102. When ending the processing in step S240, the CPU 100 shifts the processing to step S220.

Figure 7A:
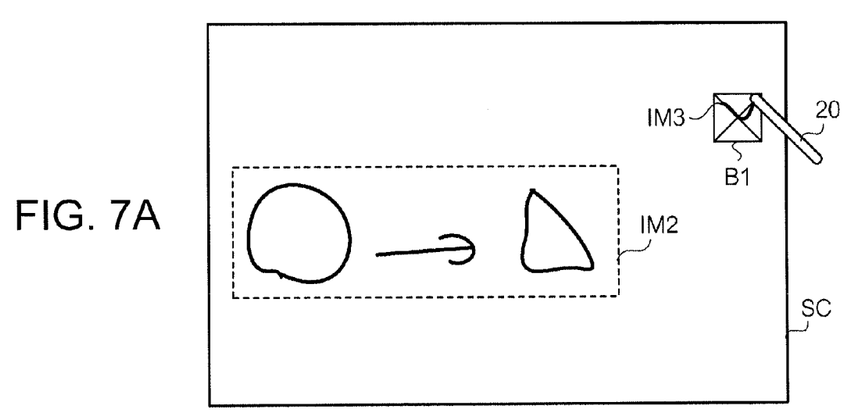
FIGS. 7A to 7C are diagrams illustrating screen transition according to an operation example 1 of the display system.
Figure 7B:
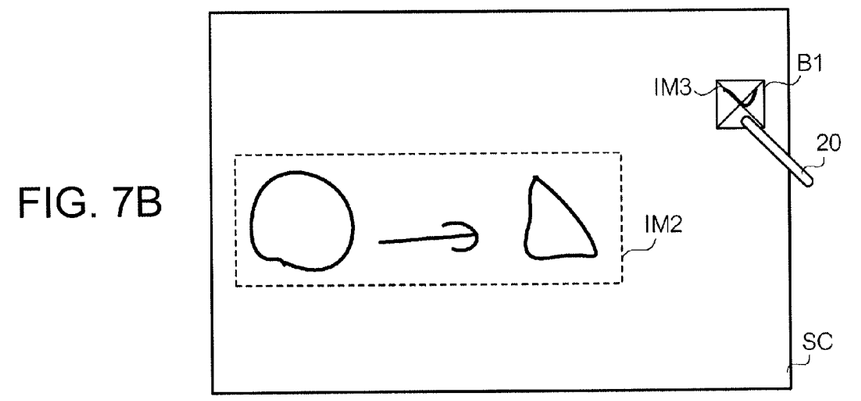
Figure 7C:
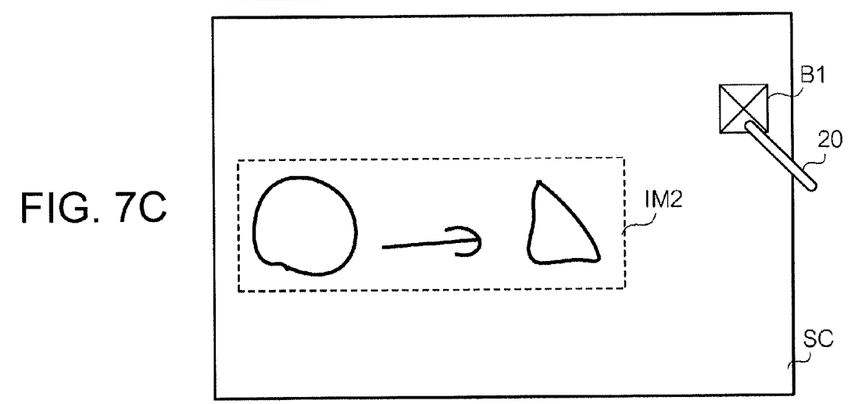

FIGS. 7A to 7C are diagrams illustrating screen transition according to an operation example 1 of the display system 1. In this example, after drawing a handwritten image IM2 using the pointer 20, the user attempts to operate a UI object B1 displayed by the information processing apparatus 30. However, the user touches the vicinity of the UI object B1 while forgetting to switch the operation mode to the PC mode. The display apparatus 10 inquires the information processing apparatus 30 whether a UI object is present in a position where a pen event is detected. Since the UI object B1 is present in a coordinate of the position, the information processing apparatus 30 transmits a replay to the effect that the UI object is present to the display apparatus 10. When receiving the replay, the display apparatus 10 draws a line IM3 (the line is a candidate line) (FIG. 7A). Further, the display apparatus 10 turns on the standby mode. Note that a representative point of the candidate line is an end point.

Thereafter, the user sets the operation mode in the PC mode via the control menu. The user touches the vicinity of the UI object (FIG. 7B). The distance between this position and the vicinity of the representative point of the candidate line, that is, a representative point of a candidate point is a threshold or less. Therefore, the display apparatus 10 erases the line IM3, which is the candidate line (FIG. 7C).

3-2. Operation Example 2

Figure 8:
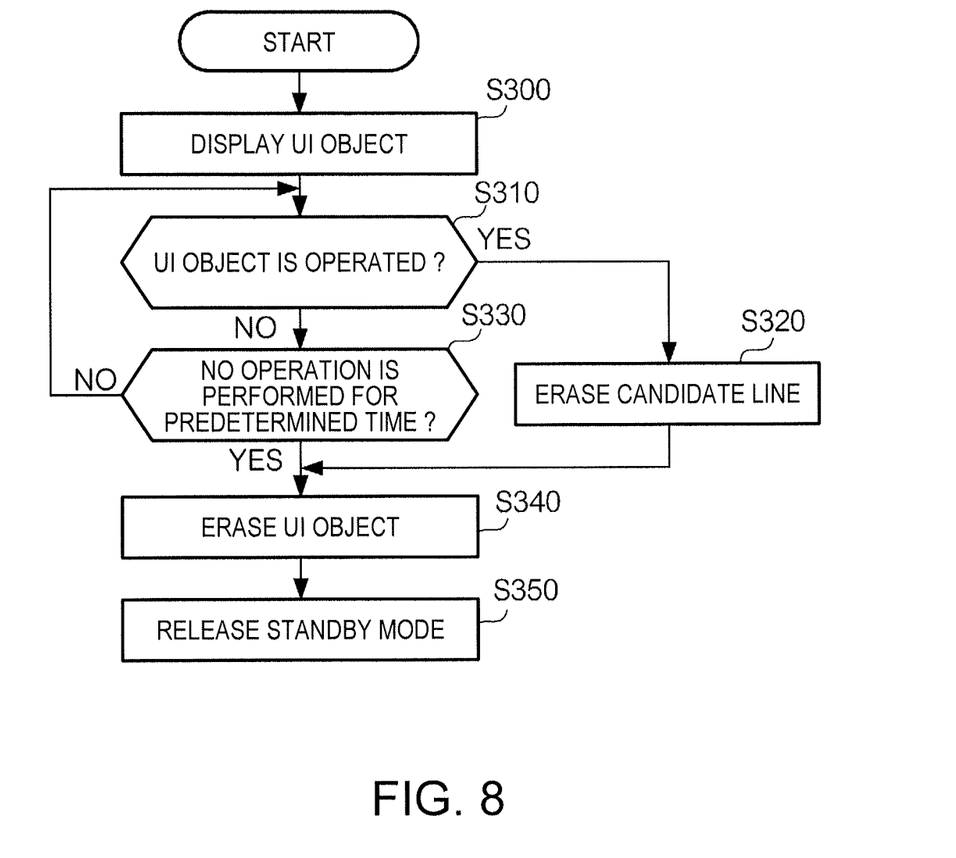
FIG. 8 is a flowchart for explaining an operation in a standby mode according to an operation example 2.

FIG. 8 is a flowchart for explaining an operation in a standby mode according to an operation example 2. In this example, a UI object (e.g., a button) for switching the operation mode to the PC mode is displayed on the screen when the operation mode shifts to the standby mode. Processing until the standby mode is enabled is the same as the processing in the operation example 1.

In step S300, the CPU 100 displays the UI object for switching the operation mode to the PC mode on the screen. The UI object is displayed by the display apparatus 10 and is displayed in the vicinity of a candidate line (within a predetermined range from a representative point of the candidate line).

In step S310, the CPU 100 determines whether the UI object is operated. That is, the CPU 100 determines whether a pen event is detected within a predetermined range including the UI object. If determining that the UI Object is operated (YES in S310), the CPU 100 shifts the processing to step S320. If determining that the UI object is not operated (NO in S310), the CPU 100 shifts the processing to step S330.

In step S320, the CPU 100 erases the candidate line. This means that the UI object is operated. That is, a line drawn most recently is against the intention of the user. After erasing the candidate line, the CPU 100 shifts the processing to step S340.

In step S330, the CPU 100 determines whether a state in which a pen event is not detected continues for a threshold time, that is, pen operation is not performed for the threshold time (a predetermined time). If the state in which a pen event is not detected continues for the threshold time (YES in S330), the CPU 100 shifts the processing to step S340. If the state in which a pen event is not detected does not continue for the threshold time (NO in S330), the CPU 100 shifts the processing to step S310.

In step S340, the CPU 100 erases the UI object displayed in step S300. Further, the CPU 100 releases the standby mode (step S350).

Figure 9A:
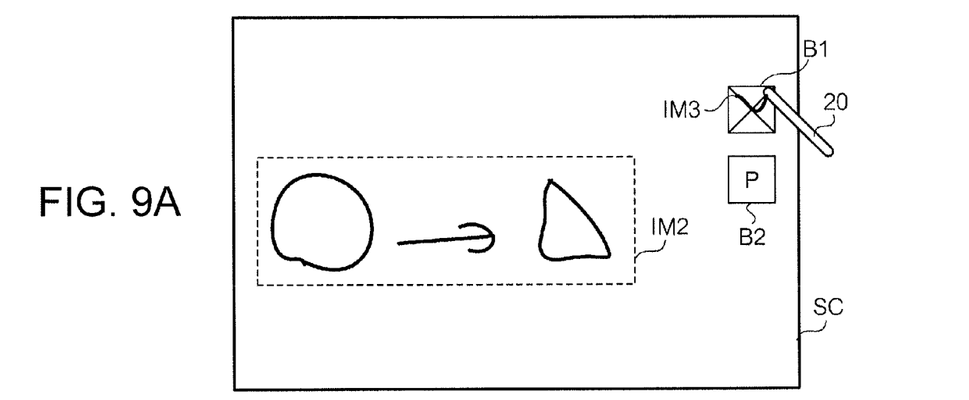
FIGS. 9A to 9C are diagrams illustrating screen transition according to the operation example 2 of the display system.
Figure 9B:
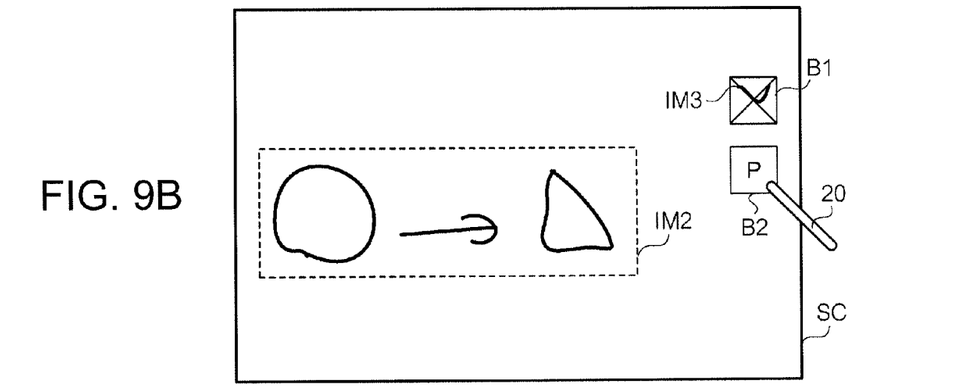
Figure 9C:
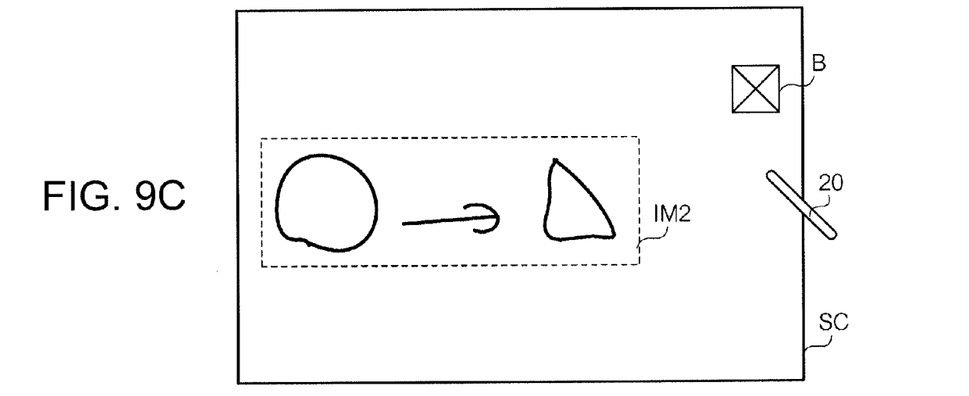

FIGS. 9A to 9C are diagrams illustrating screen transition according to the operation example 2 of the display system 1. In this example, after drawing a handwritten image IM2 using the pointer 20, the user attempts to operate the UI object B1 displayed by the information processing apparatus 30. However, the user touches the vicinity of the UI object B1 while forgetting to switch the operation mode to the PC mode. The display apparatus 10 inquires the information processing apparatus 30 whether a UI object is present in a position where a pen event is detected. Since the UI object B1 is present in a coordinate of the position, the information processing apparatus 30 transmits a replay to the effect that the UI object is present to the display apparatus 10. When receiving the replay, the display apparatus 10 draws the line IM3 (the line is a candidate line). Further, the display apparatus 10 turns on the standby mode. When the standby mode is turned on, the display apparatus 10 displays a UI object B2 for switching the operation mode to the PC mode (FIG. 9A). The UI object B1 is an image object displayed by the information processing apparatus 30 (displayed according to a video signal supplied from the information processing apparatus 30). The UI Object B2 is an image object displayed by the display apparatus 10.

In order to switch the operation mode to the PC mode, the user touches, with the pointer 20, a position where the UI object B2 is displayed (FIG. 9B). Since the UI object B2 is operated, the display apparatus 10 erases the line IM3, which is the candidate line. Further, the display apparatus 10 erases the UI object B2 and shifts the operation mode to the PC mode.

4. Modifications

The invention is not limited to the embodiments. Various modified implementations of the invention are possible. Several modifications are explained below. Two or more of the modifications may be used in combination.

An event serving as an opportunity for proceeding to the measurement of the stroke length in step S130 is not limited to the pen-up event. When an event other than the pen-up event occurs, the CPU 100 may proceed to the measurement of the stroke length as long as the event indicates that drawing of a line is completed.

A pen event detected in step S200 is not limited to the pen event explained in the embodiment. For example, the CPU 100 may shift the processing to step S230 when the pen-up event is detected.

The display apparatus 10 is not limited to the projector. The hardware configuration of the display apparatus 10 is not limited to the hardware configuration illustrated in FIG. 2. The display apparatus 10 may be a direct-view display apparatus such as a liquid crystal display or an organic EL display. In this case, the display apparatus includes a touch screen and detects, with the touch screen, a position pointed on the display surface.

A method with which the detecting unit 12 detects a position on the display surface and a method with which the detecting unit 12 detects an event related to the pointer 20 are not limited to the methods explained in the embodiment. The display apparatus 10 may specify the position of the pointer 20 according to a shape or a color of the pointer 20. The pointer 20 may include a button in a grip section of a housing and output a signal indicating the pen-down event when the user presses the button (in this case, the pointer 20 does not have to include the pressure sensor at the pen nib). Alternatively, a light emitting element (a laser diode, etc.) and a light receiving element (a photodiode, etc.) may be provided around the projection screen such that a beam covers the projection screen. The position and the pen event of the pointer 20 may be detected using a signal from the light receiving element.

The pointer 20 is not limited to the electronic pen. The pointer 20 may be a stylus pen including a housing of a specific shape or color or may be a finger of the user.

In the example explained in the embodiment, when the operation mode is switched to the standby mode, the user is notified to that effect. However, when the operation mode is switched to the interactive mode or the PC mode, the user may be notified to that effect. In this case, a method of the notification may be different according to the operation mode after the switching.

In the display system 1, sharing of the functions between the display apparatus 10 and the information processing apparatus 30 is not limited to the sharing of the functions illustrated in FIG. 1. At least a part of the functions explained as the functions of the display apparatus 10 in the embodiment may be implemented in the information processing apparatus 30. A part of the functions illustrated in FIG. 1 may be omitted.

What is claimed is:

1. A display device comprising:
   a display apparatus configured to display, on a display surface, a screen of an application program running on an information processing apparatus; and
   a processor configured to:
   detect at least two positions of a pointer on the display surface;
   when an operation mode of the display apparatus is a first mode, cause the display apparatus to draw, on the display surface, a line corresponding to a track of the at least two detected positions;
   when the operation mode is a second mode, transmit information indicating at least one of the detected at least two positions to the information processing apparatus; and
   when the operation mode of the display apparatus is the first mode and the at least one of the detected at least two positions of the pointer is within a predetermined range including at least one of: a position on the display surface of an image object for performing an input to the screen of the application program running on the information processing apparatus, and a position on the display surface corresponding to an instruction from a user for switching the operation mode to the second mode, cause the display apparatus to erase the drawn line.

2. The display device according to claim 1, wherein, when a first position of the at least two detected positions is within the predetermined range the processor controls the display apparatus to erase the drawn line.

3. The display device according to claim 1, wherein, when the operation mode is a third mode, the display apparatus displays, on the display surface, a second image object for inputting an instruction for switching the operation mode from the first mode to the second mode.

4. The display device according to claim 3, wherein the processor causes the display apparatus to erase the line when the first position of the at least two detected positions is within the predetermined range and the instruction from the user for switching the operation mode from the first mode to the second mode is received via the second image object.

5. The display device according to claim 3, wherein the processor is configured to cause the display apparatus to display the second image object within the predetermined range.

6. The display device according to claim 1, wherein the processor is configured to cause the display apparatus to erase the drawn line, when: (1) a length of the drawn line is less than or equal to a predetermined stroke length threshold, and (2) the at least one of the at least two detected positions of the drawn line is within a predetermined position range that includes a position on the screen of the image object for performing the input to the application program and/or a position on the screen for performing an input to the display apparatus for switching the operation mode of the display apparatus to be set to the second mode.

7. A display control method comprising:
   allowing a display apparatus to display, on a display surface, a screen of an application program running on an information processing apparatus;
   detecting at least two positions of a pointer on the display surface;
   when an operation mode of the display apparatus is a first mode, causing the display apparatus to draw, on the display surface, a line corresponding to a track of the at least two detected positions;
   when the operation mode of the display apparatus is a second mode, transmitting information indicating at least one of the two detected positions to the information processing apparatus; and
   when the operation mode of the display apparatus is the first mode and the at least one of the detected positions of the pointer is within a predetermined range including at least one of: a position on the display surface of an image object for performing an input to the screen of the application program running on the information processing apparatus, and a position on the display surface corresponding to an instruction from a user for switching the operation mode to the second mode, cause the display apparatus to erase the drawn line.

* * * * *